Patented Dec. 16, 1952

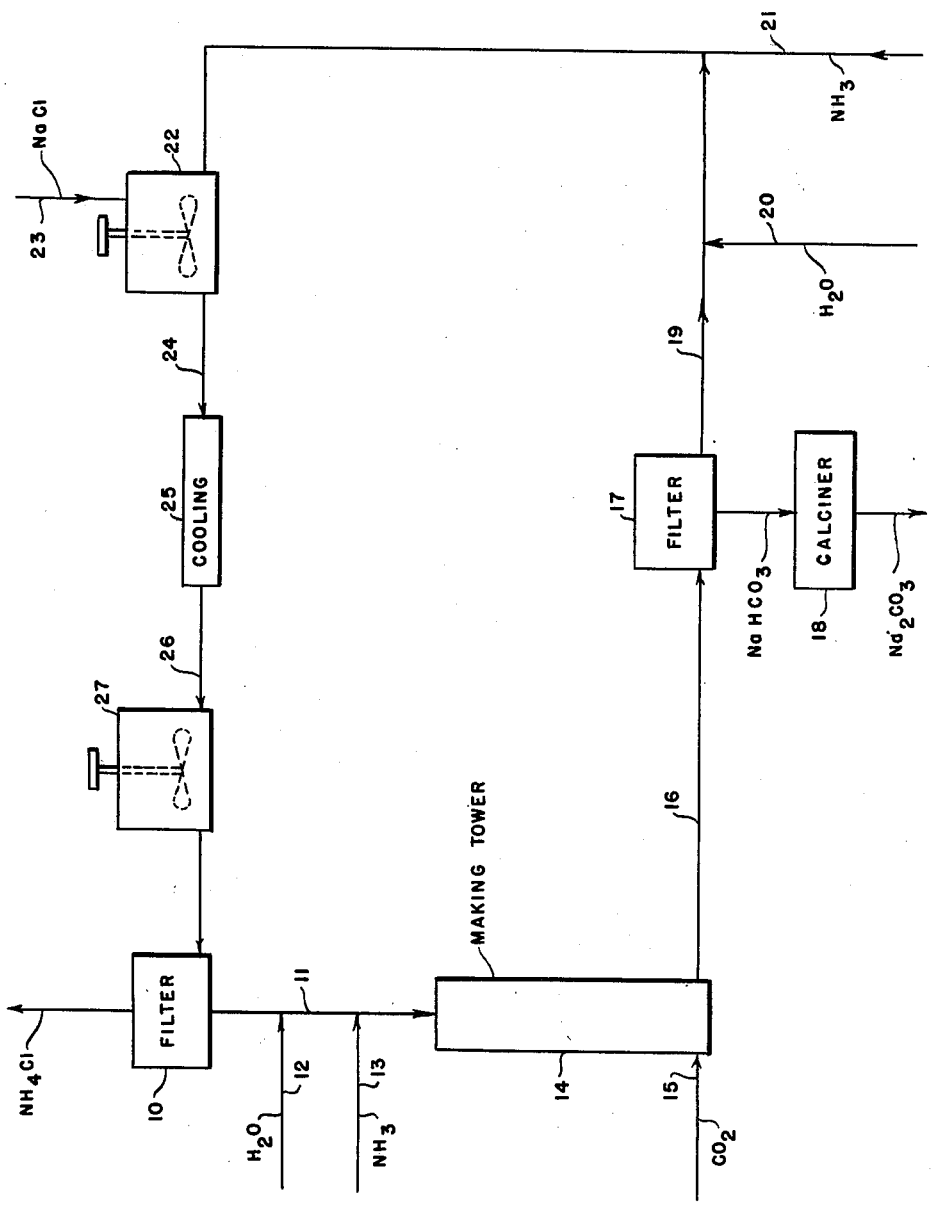

2,622,004

UNITED STATES PATENT OFFICE 2,622,004

CYCLIC PROCESS FOR PRODUCTION OF SODIUM BICARBONATE AND AMMONIUM CHLORIDE

Warren Standish Miller, Houston, Tex., and Louis C. Hirdler, Maplewood, La., assignors to Mathieson Chemical Corporation, a corporation of Virginia Application September 25, 1951, Serial No. 248,190

7 Claims. (Cl. 23—65)

Our invention relates to the production in merchantable form of ammonium chloride in a cyclical operation of the ammonia-soda type. As is well known, the ammonia-soda process is operated commercially to produce sodium bicarbonate through a double decomposition reaction involving sodium chloride and ammonium bicarbonate produced by saturating a nearly saturated sodium chloride brine with ammonia and with carbon dioxide. The sodium bicarbonate is crystallized out of solution and ordinarily is converted by calcination to sodium carbonate. The liquor remaining after the separation of the sodium bicarbonate contains ammonium chloride in addition to ammonium bicarbonate and sodium chloride.

Many attempts have been made to work up the mother liquor to separate ammonium chloride in solid form so that the residual liquid may be used again for the preparation of sodium bicarbonate. Thus it has been proposed to evaporate the solution, but such a process is uneconomic because of the large heat requirement and because the solutions become exceedingly corrosive requiring the use of costly equipment. It has also been proposed to add sufficient ammonia and sodium chloride to the mother liquid so that the bicarbonates in the liquor are converted into carbonates by neutralization and to effect crystallization of ammonium chloride upon cooling to low temperatures. Proposals of this type have proved uneconomic because of adverse yields of products of desired quality and because of the cost of refrigeration equipment and operations involved. It also has been proposed to selectively crystallize out ammonium chloride by means of an easily soluble salt of sodium or ammonium such as sodium nitrate, but such process has suffered from the serious disadvantage that the sodium bicarbonate produced is contaminated with an impurity which is not removable in the calcination step. Hence, the separation of merchantable ammonium chloride by economic means permitting re-use of the mother liquor in the ammonia-soda process has not succeeded commercially, largely because of the high water solubility of ammonium chloride, particularly at higher than ordinary temperatures. As a result, commercial operators of the ammonia-soda process conventionally treat the liquor remaining after bicarbonate separation with lime in order to recover ammonia and ultimately discard a portion of the usable salt and all of the chlorine involved in the process as chloride ion.

We have devised a cyclic two-stage process characterized by particular operating procedure and limiting conditions, which provides a process of commercial applicability by producing both sodium bicarbonate and ammonium chloride in good yield and quality in a flexible operation without need of refrigeration, evaporation or use of contaminating extraneous precipitating agents. Our process is characterized by establishing a cycle in which the composition of the circulating liquor is controlled by split addition of the ammonia required in a particular manner while adding the usual equi-molar quantities of sodium chloride in the form of the solid salt, carbon dioxide and water and while removing equivalent quantities of crystallized sodium bicarbonate and ammonium chloride. The process is further characterized by maintaining the temperature on the carbonating side of the cycle through the step of bicarbonate removal above about 28° C. and as high as 60° C., but preferably between 40°–50° C. Temperature on the ammonium chloride producing side of the cycle is reduced by cooling, but only to about 20° to 40° C. within the limits of available cooling water. By removing sodium bicarbonate at higher than conventional temperatures, we have found that high yields per unit volume of circulating liquor are obtainable on both sides of the cycle without going to extreme limits of carbonation, without refrigerating on the ammonium chloride producing side and without requiring the addition of excess salt. Less ammonia need be added to the liquor after bicarbonate removal and before ammonium chloride removal; ammonia losses therefore are reduced; and the moles of water required to dissolve the salt mixture can be reduced.

According to our invention, a cyclic two-stage process for production of sodium bicarbonate and ammonium chloride from solid salt, carbon dioxide, ammonia and water is provided in which an aqueous liquor containing sodium, ammonium, chloride, hydroxide and bicarbonate ions is circulated between a sodium bicarbonate producing stage and an ammonium chloride producing stage. Carbon dioxide is added to the ammoniated, salt-containing liquor in the sodium bicarbonate producing stage in an amount producing a ratio of bicarbonate to the sum of bicarbonate and hydroxide ions of about 0.60 to 0.80, and the temperature of the liquor is controlled at about 28° to 60° C. while separating crystallized sodium bicarbonate. The recovered liquor is circulated to the ammonium chloride producing stage, and less than the molar requirement of make-up water for a complete cycle is added. Approximately half but less than the molar requirement of ammonia for the double decomposition reactions of the complete cycle also is added to the circulating liquor until the ratio of bicarbonate to the sum of bicarbonate and hydroxide ions is about 0.37 to 0.42. Sodium chloride in the form of solid salt is added to the circulating liquor, and the temperature of the liquor is controlled at about 20° to 40° C. while dissolving the salt and separating crystallized ammonium chloride. The remaining make-up water and ammonia are added to the resulting liquor which is then circulated to the sodium bicarbonate producing stage.

In the process of our invention, we have found that it is particularly desirable to operate with a temperature of about 40° to 60° C. in the sodium bicarbonate producing stage and a temperature of about 20° to 35° C. in the ammonium chloride producing stage. We also have found that it is particularly desirable to control the rise in the ratio of bicarbonate to the sum of bicarbonate and hydroxide ions by carbonation in the sodium bicarbonate producing stage to a ratio of 0.62 to 0.67 and to control the reduction in the ratio by ammonia addition in the ammonium chloride producing stage to a ratio of 0.38 to 0.40. Further we have found that there are special advantages in commercial operation according to our invention to be obtained by adding approximately half the ammonia and approximately half the water, i. e. about 45 to 55%, in each stage. The water is added in each stage with greatest advantage by washing the crude cake of sodium bicarbonate or ammonium chloride removed by filtration or centrifuging and returning the washings to the circulating liquor.

In the ammonia-soda system, the molar concentrations of reactants per 1000 moles of water are conveniently expressed as ratios:

$$x = \frac{NH_4^+ + NH_3}{NH_4^+ + NH_3 + Na^+}$$

$$y = \frac{NH_3 + HCO_3^-}{NH_4^+ + NH_3 + Na^+}$$

$$z = \frac{HCO_3^-}{HCO_3^- + OH^-}$$

According to our invention, the ratio, $z$, of the solution resulting from the precipitation and filtration of ammonium chloride then is controlled between about 0.37 and 0.42 but preferably between 0.38 and 0.40, by split addition of the ammonia to the circulated liquor, in part following carbonation and sodium bicarbonate separation and in part following the solid salt addition and ammonium chloride separation. After the step of washing the ammonium chloride cake and adding ammonia to the filtrate, carbonation advantageously is carried to about $z = 0.60$ to 0.80, but preferably about $z = 0.62$ or slightly higher for pressures up to about 45 p. s. i. g. and at temperatures up to about 60° C.

With these $z$ values, the addition of the water to be added can be split, and approximately half of the water to be added then is available at each end of the cycle for washing the precipitated salts. In many other suggested processes for separating ammonium chloride nearly all the water must be added in the carbonation step, leaving little or none for washing the bicarbonate cake.

In operation according to our invention $x$ may vary from about 0.50 to 0.80 and $y$ from about 0.05 to 0.55 in the liquor from which ammonium chloride has precipitated as the temperature varies from 20° to 45° C. In the liquor from bicarbonate precipitation, $x$ may vary from 0.6 to 0.95 and $y$ from 0.05 to 0.4 as the temperature varies from 28° to 60° C.

Operation according to our invention will be further illustrated by reference to the accompanying drawing which represents a schematic flow diagram of the cyclic two-stage process.

In the drawing the aqueous liquor circulates continuously from the ammonium chloride filter 10 through making tower 14 to sodium bicarbonate filter 17 and thence through mixing tank 22, cooling equipment 25 and mixing tank 27 back to filter 10. The addition of a part of the required make-up water is shown diagrammatically through line 12 to the liquor recovered from filter 10 and circulating in line 11. The water of course is advantageously added in the form of washings from the crude ammonium chloride filter cake separated by filter 10. Ammonia is added to the liquor circulating through line 11 by means of connection 13. The circulating liquor is introduced to making tower 14 to which carbon dioxide is charged as indicated by means of line 15. Temperature control is provided in the usual manner in the making tower 14 to prevent a temperature rise above about 60° C. The bicarbonated liquor is circulated through line 16 to filter 17 for removal of crystallized sodium bicarbonate. The crude sodium bicarbonate may be passed after washing in the usual manner to calciner 18 for production of soda ash.

Water is added to the liquor recovered from filter 17 and circulated through line 19 by means of connection 20. Again the water is added in the form of washings from the crude sodium bicarbonate filter cake. Ammonia is added to the liquor circulating in line 19 by means of connection 21. Sodium chloride in the form of the solid salt is added as indicated by line 23 to the aqueous liquor in mixing tank 22. The liquor from tank 22 is circulated through line 24, coolers 25 and line 26 to a second mixing tank 27 in which time is provided for complete solution of the sodium chloride and precipitation of ammonium chloride. The liquor from the mixing tank 27 then is passed to filter 10 for removal of precipitated ammonium chloride.

For the carbonation step, convention making towers of the type employed in the ammonia-soda process may be used for producing the sodium bicarbonate. In the operation of our invention, the temperature rise due to the ammoniation step prior to carbonation and the carbonation itself is employed to bring the temperature of the liquor to the desired range for filtering the sodium bicarbonate. Undue temperature rise is avoided and temperature is readily controlled in our process by means of the usual cooling facilities operated in connection with conventional making towers. The bicarbonate filter liquor then can be cooled with ordinary cooling water in conventional cooling equipment to the temperature desired for ammonium chloride precipitation and filtration. As shown in the drawing, the cooling appears to follow the salt addition, but it may be desirable to precool the bicarbonate filter liquor to the temperature desired for ammonium chloride precipitation, e. g. 30° C., before the addition of salt. After the addition of salt, ammonium chloride begins to precipitate and a smaller amount of additional cooling then is required to maintain the desired temperature.

We have found that the quality of sodium bicarbonate crystal produced according to our invention is comparable to that produced in the conventional ammonia-soda process. The crystals are grainy to the feel, settle rapidly, and have a barrel-shaped, readily filterable structure. The ammonium chloride crystals are also readily filtered or centrifuged from the liquor. The bicarbonate crystals may be removed from the mother liquor on a vacuum filter of the type used in the ammonia-soda process or preferably by a type which provides several washing sections and allows re-use of the wash water from each section on one of the other sections. In order to reduce the volume of liquor to be handled in the filtration or centrifuging equipment, it is desirable to install conventional slurry thickeners before the filters or centrifuges. Each thickener is advantageously covered to prevent loss of ammonia. Provision is also made for recovery of ammonia vented from the system in the usual way by absorption.

In the operation of our invention, it should be noted that conversion per pass to sodium bicarbonate is limited by deliberately limiting the extent of carbonation and ammoniation. Ultimate yields, however, are high because the mother liquor from each separation stage is continuously recirculated in cyclic fashion through the process and because co-precipitation of contaminating components with the desired products is reduced to a minimum. In general the volume of liquor which must be handled per ton of sodium bicarbonate and sodium carbonate produced is somewhat higher than in conventional processes, since production of sodium bicarbonate is effected at temperatures above the conventional; i. e., 28° to 60° C., and preferably 40° to 60° C. We have found, however, that cycles in which the extent of carbonation and ammoniation is limited afford special advantage in terms of flexibility and economy from the commercial operating standpoint while giving desirable yields per volume of solution handled. The amounts of free ammonia present at both ends of the cycle are reduced and ammonia losses, therefore, are minimized. A substantial portion of the water to be added is made available for washing the crude sodium bicarbonate filter cake. The amount of bicarbonate ion in solution at the sodium bicarbonate end of the cycle is reduced so that the carbon dioxide vapor pressure is maintained well within practical limits of carbonation in conventional equipment.

Within the limits of temperature and molar concentrations defined above, a number of cycles are possible. One limit of the possible cycles at various values for $z$ is determined by the point at which all of the water must be added at the carbonating end of the cycle with none added in the ammonium chloride precipitating end. The opposite limit is reached at a point at which all of the water must be added in the ammonium chloride precipitating end of the cycle with none added in the sodium bicarbonate precipitating end of the cycle. When all the water is added in the bicarbonate end, the minimum yield is obtained and when all of the water is added at the ammonium chloride end of the cycle the maximum yield results. In a commercial process a cycle in which part of the water can be added at either end so that it can be used for washing the two filter cakes is important even though the yield is somewhat reduced from the maximum possibly obtainable. The yield also is increased by using lower values of $z$ in the ammonium chloride end of the cycle where the proportion of water added at the two ends of the cycle is fixed. For commercial operations, the best cycle is a compromise between those which give the highest yield per volume of solution handled and those producing less yield but which are more flexible in operation. At higher $z$ values difficulty may arise in carbonating to the point desired. If slightly more bicarbonate than is present in the carbonating solution is desired, more ammonia must be added to reduce the $z$ value. In some cases this increase may cause less advantageous amounts of ammonium chloride to precipitate. By lowering the value of $z$ in the carbonating solution, this difficulty is corrected.

Regardless of the $z$ value used in the ammonium chloride end of the cycle, the yields of ammonium chloride and sodium bicarbonate are the same. The sodium ion added as sodium chloride is removed as sodium bicarbonate while the chloride ion is removed as ammonium chloride. While cycles with the higher yields would be preferred since they require solutions of smaller volume, higher carbon dioxide pressures are required in the carbonating stage. We, therefore, prefer to limit the yields sufficiently that the operating pressure limits are not exceeded.

In operation according to our invention usually less water is required to dissolve the mixed salts at the specified temperatures, and the solubility of ammonium chloride is selectively reduced by the specified addition of only about half or less of the required ammonia with most or all of the sodium chloride and the water used in washing the crude sodium bicarbonate. The separation of ammonium chloride in good yield uncontaminated with sodium chloride or sodium bicarbonate is promoted. At the same time excellent yields of sodium bicarbonate based on the molar quantities of sodium chloride, ammonia and carbon dioxide employed are obtained, with the bicarbonate uncontaminated with sodium chloride or ammonium chloride. The crude bicarbonate, as usual contains 5-6% of ammonium bicarbonate, which is subsequently vaporized in the usual maner in the calcination of the crude bicarbonate to soda ash.

By operation in this manner, the system is readily kept in thermal balance. The heat of reaction during carbonation plus that from the absorption of the limited ammonia added in the sodium bicarbonate producing stage is utilized to heat the cool liquor from the ammonium chloride separation stage to the desired temperature of about 28° to 60° C. without temperature rise problems. Ordinary cooling water then can be employed to take up the heat of ammonia absorption in the ammonium chloride stage and reduce the liquor temperature to about 20° to 40° C.

By contrast, all of the processes so far as we know which have been proposed to recover ammonium chloride and recirculate brine in the ammonia-soda type of separation require the use of a temperature at least as low as 16° C. and usually lower for the separation of the ammonium chloride or require the addition of large amounts of a soluble salt such as sodium nitrate. On the other hand, our two-stage cyclic process permits separation of the ammonium chloride in good yield at a typical temperature of 30° C. or above so that the need for refrigeration equipment necessary to operate previous processes in warm climates is eliminated.

Our process will be further illustrated by the following example:

In a solution having a molar composition indicated below and starting at a temperature of 30° C., water used in washing a previous precipitate of ammonium chloride, ammonia and carbon dioxide are added, either together or separately, in the specified amounts, resulting in the following reaction:

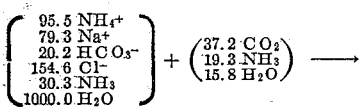
Solution II

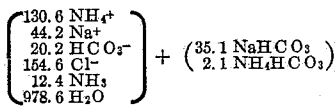
Solution I

The temperature rises due to the heat of the reaction. It may be permitted to rise above 40° to as high as 60° C. but in this example the temperature at the completion of the above reaction is to be 40° C. It may be subsequently cooled to 40° C. as the reaction is completed, however, or the temperature may be controlled by cooling so that the solution does not exceed 40° C. After separating the sodium bicarbonate by filtration, washing the cake adds to the filtrate 21.4 moles of water. All at once or in successive portions, the amounts of ammonia and solid sodium chloride indicated below are added and the mass is cooled to 30° C. and stirred. The sodium chloride goes into solution and ammonium chloride crystallizes out according to the following equation:

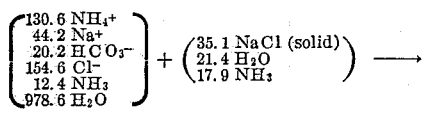
Solution I

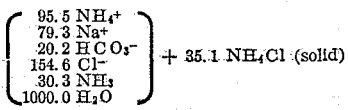
Solution II

The ammonium chloride is separated by filtration or centrifuging and the same quantity of Solution II remains as at the start, and this is available for the next cycle. The ammonium chloride cake is washed with all or part of the 15.8 moles of water to be added to the next sodium bicarbonate precipitation.

The sodium bicarbonate produced in the first step contains ammonium bicarbonate in approximately the ratio shown. The ammonium bicarbonate is considered to exist as a solid solution in the crystals of sodium bicarbonate. The ratio of ammonium bicarbonate to sodium bicarbonate is not fixed but is dependent upon the temperature and other conditions of precipitation. The composition of the bicarbonate produced by our process is thus similar to that produced by the major ammonia-soda processes of commerce. Also it should be noted that sulfate occurs naturally in brines and sodium chloride derived therefrom. In our cyclic process it will tend to accumulate slowly in the brine, but the process tolerates reasonable accumulation of this sulfate without disadvantage.

Our process is not limited to the temperatures shown in the above example but advantageously is operated at higher temperatures, particularly in the first step since the yield is increased by operating the first step higher than that of the second step. The temperature most suitable for any location for the ammonium chloride crystallization step is dependent upon the temperature of the cooling water available and should be enough higher than the cooling water temperature so that the amount of heat transfer surface required to cool the liquor is economical. The temperature may vary from 20° C. to about 40° C., according to the climate.

The temperature most suitable for the sodium bicarbonate separation step is a compromise between the increased yield which results, within limits, as the temperature is increased relative to the ammonium chloride separation step and the increasing difficulty in absorbing the carbon dioxide as the final temperature is raised. Since the carbon dioxide commonly available in ammonia-soda plants usually contains considerable amounts of inert gases such as nitrogen and oxygen which are not absorbed, these carry out of the solution more or less ammonia which must be recovered from the gases and replaced in the solution. The amount of ammonia to be recovered and replaced becomes greater as the temperature is increased. The final temperature, therefore, may vary from 28° C. to 60° C., but advantageously is from about 40° to 60° C.

The amounts of ammonia, carbon dioxide, sodium chloride and water to be added should be adjusted for the desired $z$-values whenever the temperature of either step is changed in order to obtain a maximum yield and avoid contamination of the bicarbonate with either sodium chloride or ammonium chloride or contamination of the ammonium chloride with either sodium chloride or sodium bicarbonate.

In the operation of the conventional ammonia-soda process, which is used at present for the production of most of the soda ash of commerce, a nearly saturated salt solution is the starting material. To make one mole of soda ash (by calcination of the sodium bicarbonate) it is necessary to start with 2.67 moles of sodium chloride as a nearly saturated water solution and absorb therein 3.12 moles of ammonia and 2.41 moles of carbon dioxide. The heat liberated by the absorption and reactions is by calculation 141,500 B. t. u./# mole $Na_2CO_3$. Seventy-five per cent of the sodium chloride is converted to soda ash as product.

To make one mole of soda ash (from calcination of sodium bicarbonate) by our cyclic process it is necessary to start with only about 2.05 moles of dry sodium chloride and absorb in the solutions of the process only 2.17 moles of ammonia and 2.17 moles of carbon dioxide. The heat thus liberated is by calculation 104,000 B. t. u./# mole $Na_2CO_3$. Ninety-seven and one-half per cent (97.5%) of the sodium chloride is converted to soda ash as product.

It is clear from these figures that our process represents an important technical advance over the conventional ammonia-soda process in that a better yield is obtained on the sodium chloride used, less ammonia and carbon dioxide must be absorbed, and less heat must be transferred so that less equipment is required. Moreover, valuable chlorine is recovered in useful form instead of being discarded as waste.

A major advantage of our process as compared to other processes attempting the recovery of ammonium chloride is that it permits separation of the ammonium chloride at relatively high temperature and thereby eliminates the need for refrigeration equipment. In addition, in comparison with processes requiring the use of an auxiliary salt, our process not only saves the cost involved in supplying the auxiliary substances and of making up the unavoidable losses thereof, but also avoids contamination of the products obtained with a foreign substance. Moreover, the supervision of manufacturing, necessary in such a process, is considerably simplified.

We claim:

1. In a cyclic two-stage process for production of sodium bicarbonate and ammonium chloride from solid salt, carbon dioxide, ammonia and water wherein an aqueous liquor containing sodium, ammonium, chloride, hydroxide and bicarbonate ions is circulated between a sodium bicarbonate producing stage and an ammonium chloride producing stage, the method which comprises adding carbon dioxide to the ammoniated salt-containing liquor in the sodium bicarbonate producing stage in an amount producing a ratio of bicarbonate to the sum of bicarbonate and hydroxide ions of about 0.60 to 0.80 controlling the temperature of the liquor at about 28° to 60° C. while separating crystallized sodium bicarbonate, adding less than the molar requirement of make-up water for a complete cycle to the liquor which is recovered and circulated to the ammonium chloride producing stage, adding approximately half but less than the molar requirement of ammonia to the circulating liquor to produce a ratio of bicarbonate to the sum of bicarbonate and hydroxide ions of about 0.37 to 0.42, adding sodium chloride as the solid salt, controlling the temperature of the liquor at about 20° to 40° C. while dissolving the salt and separating crystallized ammonium chloride, adding the remaining make-up water and ammonia to the liquor recovered and circulating the liquor to the sodium bicarbonate producing stage.

2. In a cyclic two-stage process for production of sodium bicarbonate and ammonium chloride from solid salt, carbon dioxide, ammonia and water wherein an aqueous liquor containing sodium, ammonium, chloride, hydroxide, and bicarbonate ions is circulated between a sodium bicarbonate producing stage and an ammonium chloride producing stage, the method which comprises adding carbon dioxide to the ammoniated salt-containing liquor in the sodium bicarbonate producing stage in an amount producing a ratio of bicarbonate to the sum of bicarbonate and hydroxide ions of about 0.60 to 0.80, controlling the temperature of the liquor at about 40° to 60° C. while separating crystallized sodium bicarbonate, adding less than the molar requirement of make-up water for a complete cycle to the liquor which is recovered and circulated to the ammonium chloride producing stage, adding approximately half but less than the molar requirement of ammonia to the circulating liquor to produce a ratio of bicarbonate to the sum of bicarbonate and hydroxide ions of about 0.37 to 0.42, adding sodium chloride as the solid salt, controlling the temperature of the liquor at about 20° to 35° C. while dissolving the salt and separating crystallized ammonium chloride, adding the remaining make-up water and ammonia to the liquor recovered and circulating the liquor to the sodium bicarbonate producing stage.

3. In a cyclic two-stage process for production of sodium bicarbonate and ammonium chloride from solid salt, carbon dioxide, ammonia and water wherein an aqueous liquor containing sodium, ammonium, chloride, hydroxide and bicarbonate ions is circulated between a sodium bicarbonate producing stage and an ammonium chloride producing stage, the method which comprises adding carbon dioxide to the ammoniated salt-containing liquor in the sodium bicarbonate producing stage in an amount producing a ratio of bicarbonate to the sum of bicarbonate and hydroxide ions of about 0.62 to 0.67, controlling the temperature of the liquor at about 28° to 60° C. while separating crystallized sodium bicarbonate, adding less than the molar requirement of make-up water for a complete cycle to the liquor which is recovered and circulated to the ammonium chloride producing stage, adding approximately half but less than the molar requirement of ammonia to the circulating liquor to produce a ratio of bicarbonate to the sum of bicarbonate and hydroxide ions of about 0.38 to 0.40, adding sodium chloride as the solid salt, controlling the temperature of the liquor at about 20° to 40° C. while dissolving the salt and separating crystallized ammonium chloride, adding the remaining make-up water and ammonia to the liquor recovered and circulating the liquor to the soduim bicarbonate producing stage.

4. In a cyclic two-stage process for production of sodium bicarbonate and ammonium chloride from solid salt, carbon dioxide, ammonia and water wherein an aqueous liquor containing sodium, ammonium, chloride, hydroxide and bicarbonate ions is circulated between a sodium bicarbonate producing stage and an ammonium chloride producing stage, the method which comprises adding carbon dioxide to the ammoniated salt-containing liquor in the sodium bicarbonate producing stage in an amount producing a ratio of bicarbonate to the sum of bicarbonate and hydroxide ions of about 0.60 to 0.80, controlling the temperature of the liquor at about 28° to 60° C. while separating crystallized sodium bicarbonate, adding about half the molar requirement of make-up water for a complete cycle to the liquor which is recovered and circulated to the ammonium chloride producing stage, adding approximately half but less than the molar requirement of ammonia to the circulating liquor to produce a ratio of bicarbonate to the sum of bicarbonate and hydroxide ions of about 0.37 to 0.42, adding sodium chloride as the solid salt, controlling the temperature of the liquor at about 20° to 40° C. while dissolving the salt and separating crystallized ammonium chloride, adding the remaining make-up water and ammonia to the liquor recovered and circulating the liquor to the sodium bicarbonate producing stage.

5. In a cyclic two-stage process for production of sodium bicarbonate and ammonium chloride from solid salt, carbon dioxide, ammonia and water wherein an aqueous liquor containing sodium, ammonium, chloride, hydroxide and bicarbonate ions is circulated between a sodium bicarbonate producing stage and an ammonium chloride producing stage, the method which comprises adding carbon dioxide to the ammoniated salt-containing liquor in the sodium bicarbonate producing stage in an amount producing a ratio of bicarbonate to the sum of bicarbonate and hydroxide ions of about 0.60 to 0.80, controlling the temperature of the liquor at about 28° to 60° C. while separating crystallized sodium bicarbonate, adding less than the molar requirement of make-up water for a complete cycle to the ammonium chloride producing stage, adding approximately half the molar requirement of ammonia to the circulating liquor to produce a ratio of bicarbonate to the sum of bicarbonate and hydroxide ions of about 0.37 to 0.42, adding sodium chloride as the solid salt, controlling the temperature of the liquor at about 20° to 40° C. while dissolving the salt and separating crystallized ammonium chloride, adding the remaining make-up water and ammonia to the liquor recovered and circulating the liquor to the sodium bicarbonate producing stage.

6. In a cyclic two-stage process for production of sodium bicarbonate and ammonium chloride from solid salt, carbon dioxide, ammonia and water wherein an aqueous liquor containing sodium, ammonium, chloride, hydroxide and bicarbonate ions is circulated between a sodium bicarbonate producing stage and an ammonium chloride producing stage, the method which comprises adding carbon dioxide to the ammoniated salt-containing liquor in the sodium bicarbonate producing stage in an amount producing a ratio of bicarbonate to the sum of bicarbonate and hydroxide ions of about 0.60 to 0.80, controlling the temperature of the liquor at about 40° to 60° C. while separating crystallized sodium bicarbonate, adding about half the molar requirement of make-up water for a complete cycle to the liquor which is recovered and circulated to the ammonium chloride producing stage, adding approximately half the molar requirement of ammonia to the circulating liquor to produce a ratio of bicarbonate to the sum of bicarbonate and hydroxide ions of about 0.37 to 0.42, adding sodium chloride as the solid salt, controlling the temperature of the liquor at about 20° to 35° C. while dissolving the salt and separating crystallized ammonium chloride, adding the remaining make-up water and ammonia to the liquor recovered and circulating the liquor to the sodium bicarbonate producing stage.

7. In a cyclic two-stage process for production of sodium bicarbonate and ammonium chloride from solid salt, carbon dioxide, ammonia and water wherein an aqueous liquor containing sodium, ammonium, chloride, hydroxide and bicarbonate ions is circulated between a sodium bicarbonate producing stage and an ammonium chloride producing stage, the method which comprises adding carbon dioxide to the ammoniated salt-containing liquor in the sodium bicarbonate producing stage in an amount producing a ratio of bicarbonate to the sum of bicarbonate and hydroxide ions of about 0.62 to 0.67, controlling the temperature of the liquor at about 28° to 60° C. while separating crystallized sodium bicarbonate, adding about half the molar requirement of make-up water for a complete cycle to the liquor which is recovered and circulated to the ammonium chloride producing stage, adding approximately half the molar requirement of ammonia to the circulating liquor to produce a ratio of bicarbonate to the sum of bicarbonate and hydroxide ions of about 0.38 to 0.40, adding sodium chloride as the solid salt, controlling the temperature of the liquor at about 20° to 40° C. while dissolving the salt and separating crystallized ammonium chloride, adding the remaining make-up water and ammonia to the liquor recovered and circulating the liquor to the sodium bicarbonate producing stage.

WARREN STANDISH MILLER.
LOUIS C. HIRDLER.

No references cited.